United States Patent
Forghieri et al.

(10) Patent No.: US 8,218,969 B2
(45) Date of Patent: Jul. 10, 2012

(54) OFDM TRANSPONDER INTERFACE WITH VARIABLE BIT TRANSFER RATE IN OPTICAL COMMUNICATIONS SYSTEMS

(75) Inventors: Fabrizio Forghieri, Monza (IT); Marco Croci, Carate Brianza (IT); Luca Della Chiesa, Concorezzo (IT)

(73) Assignee: Cisco Technology, Inc., San Jose, CA (US)

( * ) Notice: Subject to any disclaimer, the term of this patent is extended or adjusted under 35 U.S.C. 154(b) by 591 days.

(21) Appl. No.: 12/406,577

(22) Filed: Mar. 18, 2009

(65) Prior Publication Data
US 2010/0239259 A1 Sep. 23, 2010

(51) Int. Cl.
*H04J 4/00* (2006.01)
(52) U.S. Cl. .................. 398/76; 398/27; 398/69; 398/79
(58) Field of Classification Search ............... 398/27, 398/69, 76
See application file for complete search history.

(56) References Cited

U.S. PATENT DOCUMENTS

| | | | |
|---|---|---|---|
| 7,310,301 B1 | 12/2007 | Kleider et al. | |
| 2002/0145782 A1* | 10/2002 | Strasser et al. | 359/127 |
| 2009/0180778 A1* | 7/2009 | Rhee et al. | 398/79 |
| 2009/0196602 A1* | 8/2009 | Saunders et al. | 398/26 |

FOREIGN PATENT DOCUMENTS

| | | |
|---|---|---|
| GB | 2434065 A | 11/2007 |
| JP | 2003174428 A | 6/2003 |
| WO | 9810545 A1 | 3/1998 |
| WO | 2008074085 A1 | 6/2008 |

OTHER PUBLICATIONS

PCT The International Search Report and the Written Opinion, PCT/US2010/022821 (13 pages).

* cited by examiner

*Primary Examiner* — Jessica Stultz
*Assistant Examiner* — Xnning Niu
(74) *Attorney, Agent, or Firm* — Edell, Shapiro & Finnan, LLC

(57) ABSTRACT

OFDM (Orthogonal Frequency Division Multiplexing) has been proposed for processing signals over WDM channels in an optical network. The number of OFDM sub-carrier channels utilized in transmitting optical signals from a transmitting node to a remote is adapted to the quality of transmission in a WDM channel. Responsive to control signals from the remote node, the number of used sub-carrier channels is set to optimize optical performance of the WDM channel.

14 Claims, 5 Drawing Sheets

OFDM TRANSPONDER INTERFACE WITH VARIABLE BIT TRANSFER RATE IN OPTICAL COMMUNICATIONS SYSTEMS

BACKGROUND OF THE INVENTION

The present invention is related to optical networks in general and, in particular, to OFDM transponder interfaces.

A present trend in telecommunications is the installation of optical networks with ever increasing data transfer rates. Optical networks in general allow high signal bandwidths, and multiple communications channels can be created over a single optical fiber with techniques, such as WDM (Wavelength Division Multiplexing) and its successor DWDM (Dense Wavelength Division Multiplexing). (Hereafter, for brevity's sake, any technology which uses wavelength to define a path in an optical network is simply referred to as WDM.) Current and proposed optical networks offer bandwidths of 10, 40, and even 100 Gbs (Gigabits per second). This rise in bit transfer rates is a consequence of not only technical development but also the burgeoning demand for the much anticipated applications of voice, computer data and video delivery with optical networks. For example, such applications include video-on-demand, such as Internet TV, amateur video blogs, and social networking video.

Among the different techniques which are currently being investigated to increase the optical performance of optical networks is OFDM (Orthogonal Frequency Division Multiplexing). In OFDM the data of a communication channel is broken into a large number of sub-carriers with each subcarrier modulated at a lower symbol rate than that of the channel, but the total rate of all the sub-carriers is equal to that of the conventionally modulated channel. In the case of a WDM optical network, each communication channel comprises a narrow defined wavelength range so that the sub-carriers fit within that wavelength range. OFDM has the advantage that its signals can manage severe channel conditions.

Notwithstanding techniques, such as OFDM, which can improve the performance of an optical network, the enthusiasm for ever-increasing optical performance overlooks a potential problem. The eventual aging and inevitable deterioration in performance of these networks have not been considered to any extent. Of course, one way of dealing with a declining network is to simply replace it. But this is a very expensive investment and a time-consuming operation.

An alternative is to keep the declining network in operation. In optical network design, the quality of performance is balanced against the costs of such performance as in any actual system. That is, among other considerations, the links of a network are designed with a particular bandwidth in mind. The definition or the shape of an optical signal naturally deteriorates as the signal travels along an optical fiber and as the bandwidth (i.e., the bit transfer rate) rises, the definition of the optical signal deteriorates faster. Thus the network, depending upon the signal bandwidth, must place optical amplifiers at locations along the link to regenerate the signals before they deteriorate beyond recognition. As network components age, optical performance naturally falls. Steps must be taken to ensure that the network operates at its maximum capacity despite the declining performance.

The present invention is directed generally toward adapting optical networks for declining optical performance and, in particular, toward adapting OFDM optical networks toward such decline.

BRIEF SUMMARY OF THE INVENTION

In an overview of the present invention:

One aspect of the present invention provides for a method of transmitting signals across an optical fiber link to a remote node in an optical network. The method has the steps of: transmitting OFDM signals in a WDM channel across the optical fiber link to the remote node at a bit transfer rate; receiving control signals across the optical network link responsive to transmission quality of signals transmitted to the remote node; and adjusting a number of sub-carrier channels of the OFDM channels responsive to the received control signals to vary the bit transfer rate of the WDM channel whereby optical performance of the optical fiber link is optimized.

Another aspect of the present invention provides for a transponder between a network node and an optical fiber link to a remote node at an opposite end of said link, said optical fiber link having a transmitting optical fiber and a receiving optical fiber. The transponder has a network node input port receiving signals from said network node; a network node output port transmitting signals to said network node; an optical fiber link output port transmitting OFDM optical signals to said transmitting optical fiber of said optical fiber link to said remote node over a WDM channel; an optical fiber link input port receiving OFDM optical signals from said receiving optical fiber and passing said optical signals to said network node output port, said received signals including control signals indicative of a bit transfer rate for signals transmitted to said remote node over said WDM channel of said transmitting optical fiber; and a unit deserializing signals from said network node input port for a number of OFDM sub-carrier channels for said OFDM optical signals to said transmitting optical fiber, said number adjusted responsive to said received signals indicative of said bit transfer rate; whereby optical performance of said WDM channel is optimized.

DETAILED DESCRIPTION OF THE INVENTION

Figure 1:
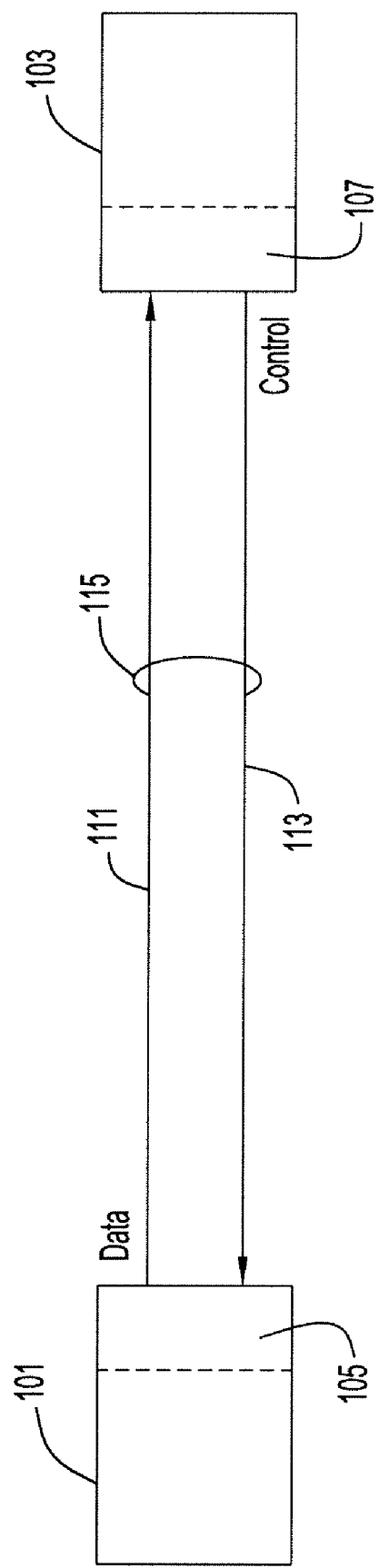
FIG. 1 is an example arrangement of two network nodes interconnected by an optical link operating according to one embodiment of the present invention.

FIG. 1 illustrates an example arrangement of network nodes in an optical network to illustrate the operation and benefits of the present invention. Network nodes 101 and 103 are interconnected by an optical fiber link formed by two optical fibers 111 and 113. Other nodes and optical fiber links for the optical network are not shown. As shown in this example, the two nodes 101 and 103 communicate over the optical fiber link 115, which has one optical fiber 111 carrying optical signals to the other node 103 and the other fiber 113 carrying optical signals in the opposite direction. The node 101 has a transponder 105 which translates electrical signals into optical signals and sends the optical signals over the optical fiber 111 to the node 103 and receives optical signals from the optical fiber 113 from the node 103 and translates the optical signal into electrical signals. Likewise, the node 103 has a transponder 107 which sends and receives optical signals over the optical fibers 113 and 111 respectively and translates the electrical signals of the node into optical signals for transmission and received optical signals into electrical signals for the node. In a WDM system the nodes 101 and 103 communicate over a plurality of communications channels, each channel a wavelength band in a grid of WDM channels between the two nodes.

As the components of an optical network deteriorate under various effects, including wear and age, the optical performance of the network, as measured by the OSNR (Optical Signal-to-Noise Ratio) of the transmitted signals, fall. The OSNR is the optical signal-to-noise ratio (OSNR), the ratio of the optical signal power to the noise power. A simple relationship between information capacity, bandwidth and SNR (or in this case, OSNR) over a communications channel is:

$$I = B \log_2(1+SNR) = 3.32 B \log_{10}(SNR)$$

where I is the information capacity (bps); B is the bandwidth (Hz) or bit transfer rate; and SNR is, of course, the signal-to-noise ratio. That is, the amount of data that a communications channel can transport per unit time is directly proportional to the product of the channel's bandwidth, the bit transfer rate, and the logarithm of the SNR of the channel. Thus as the OSNR of a link in an optical network falls, the information capacity of the link also falls if the bandwidth is kept constant.

In practice, a fall in the OSNR results in an increased BER (bit error rate), another measure of optical performance. As the signal strength falls with respect to the noise on the link, the number of errors as measured by the BER rises. The decline of the link can also be viewed as a reduction of the reach, the distance the optical signals can be transmitted along an optical fiber before the signals are irreparably degraded. But the network links have been installed with the higher optical performance and longer reach in mind. One measure to compensate for the decline in reach is to place regenerators in new locations of the link to compensate for the shortened reach. This permits the network to retain its bandwidth and its information capacity. But for the many optical network links, such as long distance links, it may be impractical or too costly to insert regenerators in the links to raise the OSNR of the signals. In one sense, the insertion of additional regenerators might be considered a half-way replacement of the network.

The present invention provides for an alternate way of handling declining optical performance in optical networks. The bandwidth of a network channel is lowered (and the reach of the network transmitters is maintained) in the context of an OFDM system in response to declining network performance so that network channel bandwidth, the transmission bit rate, is adapted to the available OSNR. Of course, though the decline in network performance can be due to component aging and stress, any network decline, such as channel interference and crosstalk from a network change, for example, can be addressed by selectively lowering the bandwidth for certain portions of the optical networks.

Figure 2:
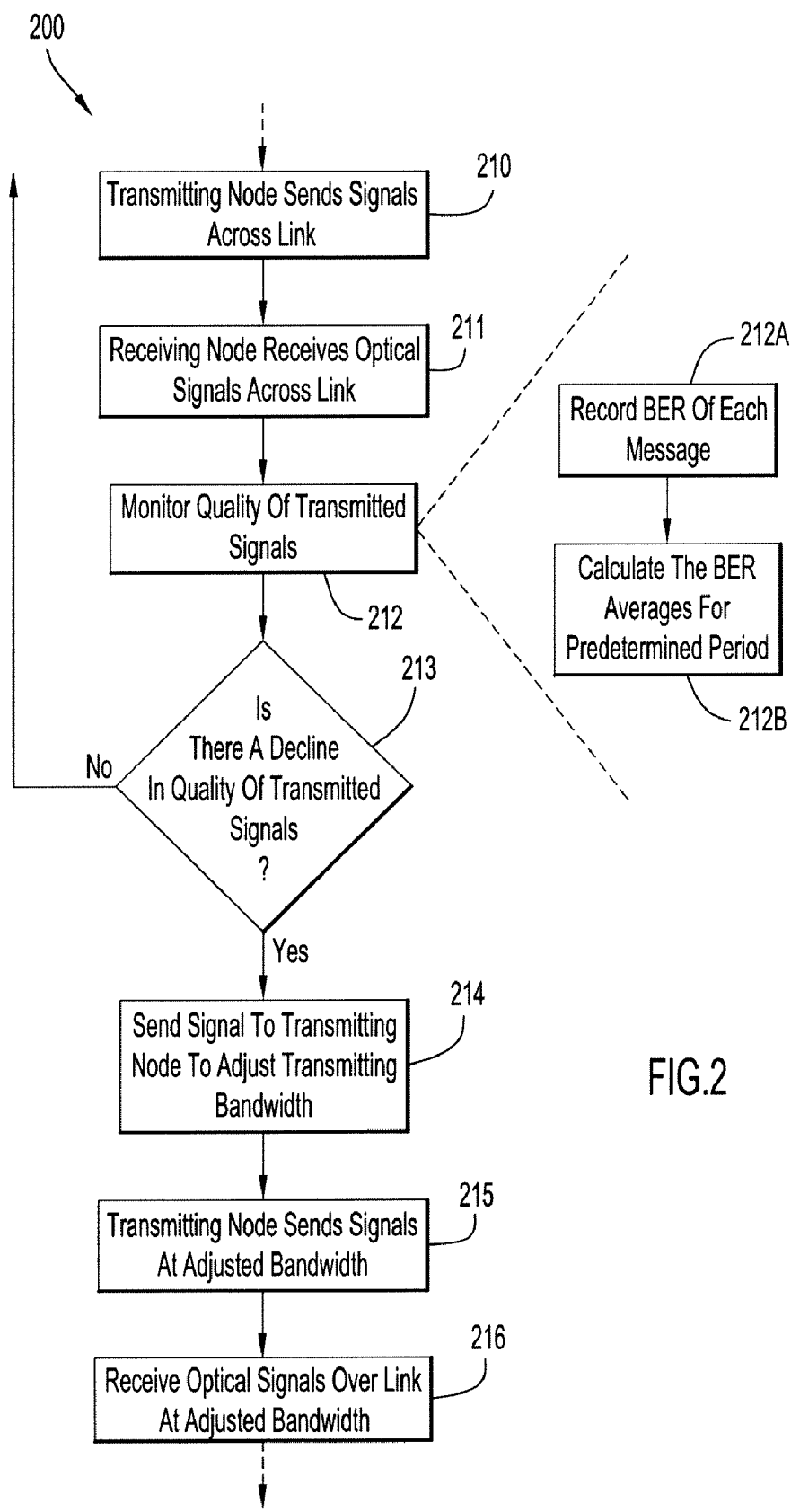
FIG. 2 is a flow chart of operations and steps to adapt an optical network to lowered optical performance across a communications channel over the optical link in the FIG. 1 arrangement.

FIG. 2 is a flow chart of general operations of two optical network nodes communicating over a WDM channel in an optical fiber link, such as shown by FIG. 1. The initial dotted arrow at the top of the drawing indicates that these operations are a part of ongoing node operations. In step 210 the transmitting node 101 of FIG. 1 transmits optical signals over the link to the remote node 103 and the remote node receives the optical signals across the link in step 211. The remote node 103 monitors the quality of transmission of the received signals in step 212. Step 212 includes the substeps 212A and 212B. In step 212A the BER for each message is recorded. In this example, the BER is used instead of other measurements of optical performance, such as the OSNR. The BER is convenient because it is typically used to monitor transmission quality in many optical network administration systems. In substep 212B the BER averages in one-hour periods, for example, are calculated. Of course, the BERs of messages with catastrophic failures, such as fiber cuts and network element failures, are not used to avoid skewing the averages from long-term trends, and the BERs described here are the bit error rates of messages prior to any error decoding, i.e., the BERs prior to any FEC decoding. Modern optical networks typically encode messages with error correction/detection codes before transmission, often termed forward error coding (FEC), to increase network performance and bit transfer rates.

Then step 213 determines whether there is a trend in the quality of transmission from the BER averages. If there is no decline, ordinary operations continue as shown by the feedback loop on the left. If there is a monotonic decline in the averages over a period of several hours, i.e., $$\langle BER \rangle_{hour\_i} \geq \langle BER \rangle_{hour\_i+1}$$

for i=0 to 5, say, then a trend in optical performance decline has been found. Of course, other tests and other optical parameters may be used to determine a decline in network performance. With a determination of network performance decline, the remote node 103 signals to the transmitting node 101 by step 214 to transmit optical signals at an adjusted bit transfer rate than the original bit transfer rate to improve the BER. As shown in FIG. 1, the remote node 103 sends control signals over a WDM channel, i.e., an ordinary data channel, of the optical fiber 113. Alternatively, the remote node 103 can send the control signals to the transmitting node 101 over special control channels, such as OSC (Optical Supervisory Channel), or through a network management and control sub-network which oversees the operations of the optical network. In any case, the remote 103 communicates the quality of transmission to the transmitting node 101.

In response to the control signals from the remote node 103, the transmitting node 101 in step 215 sends signals at an adjusted, presumably lower, bit transfer rate, described in detail below so that the receiving node 103 receives signals at the second, lower transmission bandwidth in step 216. Network operations continue at the adjusted bandwidth as indicated by the dotted arrow from step 216. Not shown is a feedback loop by which the quality of the transmitted signals is monitored continually and the transmitting bandwidth is adjusted accordingly.

Figure 3:
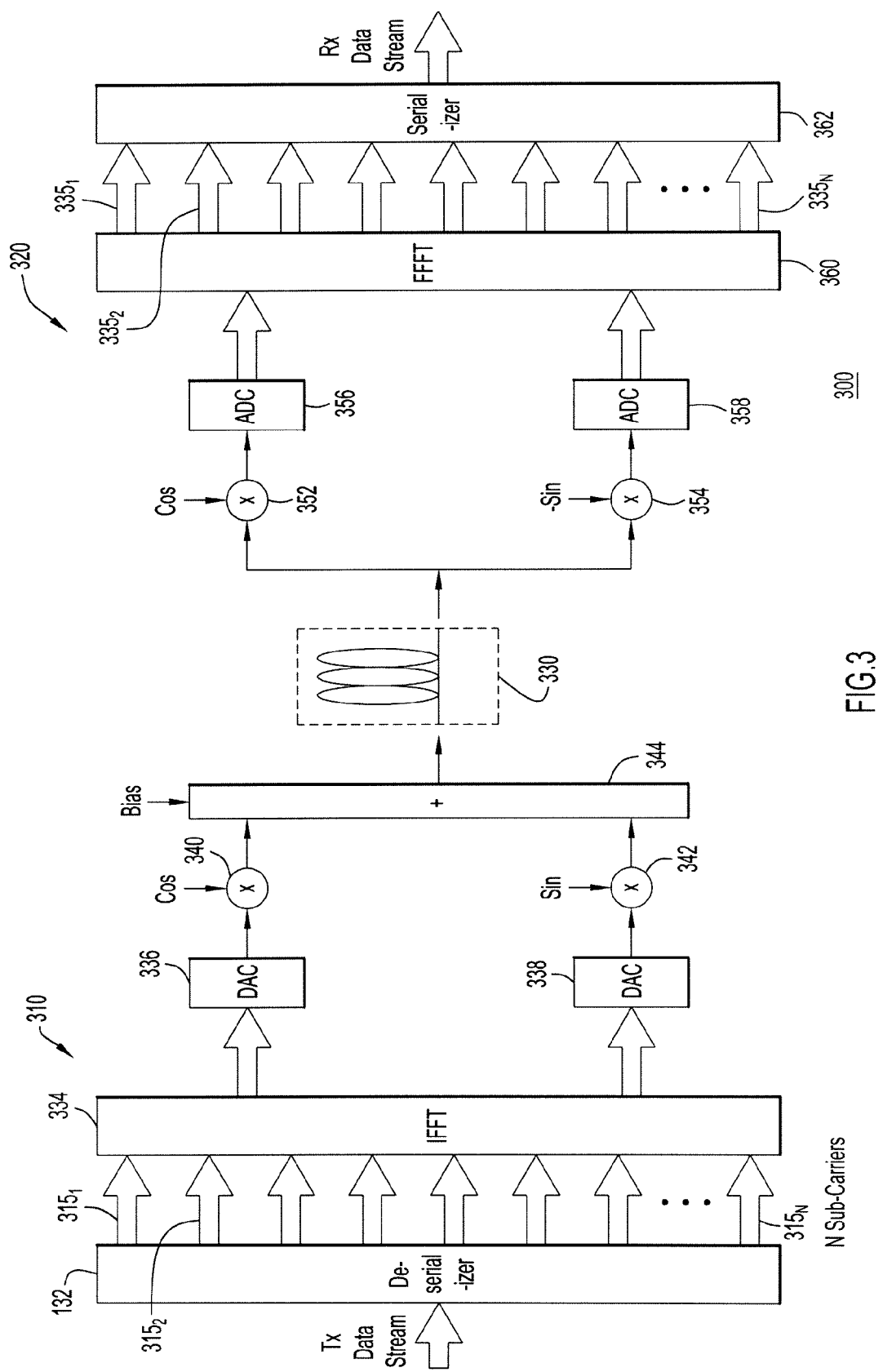
FIG. 3 is an OFDM transmission system with a transponder transmitter module and a transponder receiver module.

As stated earlier, OFDM has been considered as a technique for increasing data transmission rates for optical networks. The present invention shows how an OFDM-based optical network can adapt to changing, presumably declining, bit transfer rates. FIG. 3 illustrates an OFDM (Orthogonal Frequency Division Multiplexing) system 300 arranged to transmit data in a WDM optical network. A single WDM channel is divided into a plurality of sub-carrier channels and the total data rate sent through the channel is divided among these subcarriers. Each subcarrier is orthogonal to each other so they can be modulated and demodulated even if their spectra overlap. This also allows for a greater spectral efficiency, i.e., more information can be sent over a given spectrum. Only the transmission of OFDM signals in one direction is shown and described.

The OFDM transmission system 300 has a transmitter module 310, typically part of the transponder (such as the transponder 105 in FIG. 1) of a transmitting node, a receiver module 320, typically part of the transponder (such as the transponder 107 in FIG. 1) of a receiving node, and a WDM channel 130 over which the transmitter module 310 communicates to the receiver module 320. The OFDM transmitter module 310 which operates in the electrical signal domain includes a serial-to-parallel converter (or deserializer unit) 332, an Inverse FFT (Fast Fourier Transform) unit 334, a first digital-to-analog converter (DAC) 336 for the real components of the transform, a second digital-to-analog converter (DAC) 338 for the imaginary component of the transform, analog multipliers 340, 342, and an analog adder 344. Not shown but part of the transmitter module 310 is an optical transmitter which is responsive to the electrical signals from the analog adder 344 to translate the electrical signals to optical signals for the WDM channel 330.

The optical signals of the WDM channel 330 are carried over an optical fiber (such as the optical fiber 111 of the link 115 in FIG. 1). At the other end of the WDM channel 330 is the receiver module 320 includes analog multipliers 352, 354, a first analog-to-digital converter (ADC) 356 for the real components of a Fast Fourier Transform, a second ADC 358 for the imaginary components of the fast Fourier transform, a Forward FFT (Fast Fourier Transform) unit 360, and a parallel-to-serial module (or serializer) 362. Not shown but part of the receiver 320 is an optical receiver which is responsive to the optical signals from the WDM channel 330 to translate the optical signals to electrical signals for rest of the receiver module 320 to process.

A brief description of OFDM might aid in understanding the present invention and its embodiments. OFDM digital signal processing operations of the transmitter module 310 and transmitter module 320 should be well understood by designers of optical networks. The digital data stream to be transmitted over a DWDM channel is received by a port of the transmitter module 310 from the transmitting node and converted into N parallel streams of electrical data by the deserializer 332. These N parallel streams form the basis for the sub-carrier channels of the OFDM transmission, i.e., sub-carrier channel bandwidths within the overall allowed bandwidth of the WDM channel. Each of the N bit streams is sent to the Inverse FFT unit 334 which calculates the inverse discrete Fourier transform of the N sub-carrier channels. The IFFT unit 334 converts the frequency domain signals, the N bit stream representing the N subcarrier frequency components, into time domain signals. The resulting time domain signals have real and imaginary components and each of these components are converted into analog signals by the first DAC 336 for the real components and by the second DAC 338 for the imaginary components. The analog real component of a sub-carrier frequency is multiplied by the cosine at that sub-carrier frequency by the analog multipliers 340 and the analog imaginary component of the sub-carrier frequency is multiplied by the sine at that sub-carrier frequency by the analog multiplier 342. These real and imaginary product components are combined over all N sub-carrier frequencies by the analog adder 344 which is biased. The resulting analog signal drives the optical transmitter of the channel 330 which acts as an output port for the transmitter module 310.

After passing through the WDM channel 330, the optical signals are received by an input port of the receiver module 320 and translated into electrical analog signals by the optical receiver (not shown) of the module 320. The received electrical analog signals are multiplied with cosine wave components and negative sine wave components, respectively, by the two analog multipliers 352, 354. The real and imaginary components of the OFDM subcarrier frequencies are recovered. The recovered components are converted to digital signals by the first ADC 356 for the real components and by the second ADC 358 for the imaginary components and the Forward FFT unit 360 applies the discrete Fourier transform to the digital signals by a fast Fourier transform algorithm. These signals are transformed back in the sub-carrier frequency domain. The parallel streams of sub-carrier signals are converted into a single stream of serial signals by the serializer 362 to a node output port. If everything is operating properly, the Receiver Data Stream leaving the receiver module 330 on the right side of the FIG. 3 is the same as the Transmitter Data Stream entering the transmitter module 310 on the left side of the drawing.

As illustrated in FIG. 3, the total number of sub-carrier channels is N, which is always a power of 2 and large, i.e., typically at least $2^{10}$, 1024. The frequencies of the sub-carrier channels are evenly distributed over the wavelength bandwidth of the WDM channel. Not all the sub-carrier channels need be used. Since the total output power of the optical channel tends to be fixed, the utilized frequency sub-carrier bands receive a larger share of the optical power, thereby improving the OSNR at the receiver. The present invention utilizes this feature of OFDM and adjusts the number of sub-carrier channels carrying data in a WDM channel according to the channel performance. The remaining sub-carrier channels are not used.

In response to the FIG. 2 step 214 by which the receiving node sends one or more signals to lower transmitting bandwidth, the transmitting node responds by step 215. To lower the transmitting of the WDM channel, the transmitting node reduces the number of sub-carrier channels to lower bandwidth of the channel, i.e., to lessen the amount of data transmitted over the WDM channel per unit time. The amount of bandwidth reduction can be done in a stepwise manner. Each time the BER (or OSNR) falls below a predetermined amount (step 213 in FIG. 2) and triggers signal(s) to the transmitting node, the amount by which the transmitting bandwidth is lowered (step 215) can be a set amount. If the reduction in the transmitting bandwidth is insufficient, another signal(s) to the transmitting node elicits another lowered transmitting bandwidth response. In this manner, the transmitting bandwidth is lowered incrementally until an acceptable BER (or OSNR) is reached. Alternatively, the amount by which the transmitting bandwidth is lowered can be performed in one step. The signal(s) sent to the transmitting node indicates the amount by which the transmitting bandwidth should be lowered.

Figure 4:
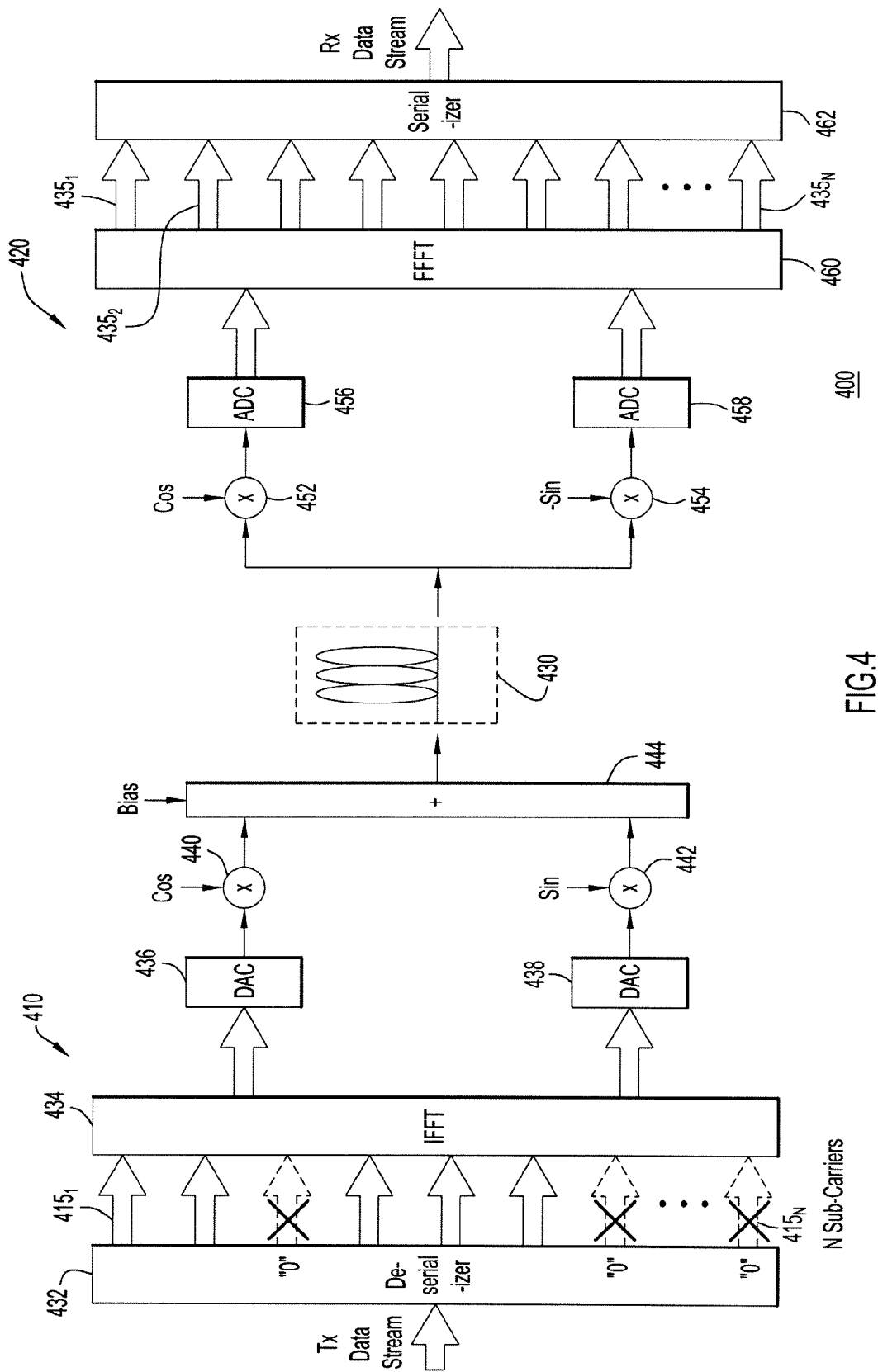
FIG. 4 is an OFDM transmission scheme showing a transmitter module and a receiver module operating at a reduced bandwidth, according to one embodiment of the present invention.

FIG. 4 illustrates an OFDM system 400 for transmitting data at data rates responsive to the quality of the received data signals, according to one embodiment of the present invention. The elements of the system have the same general function as the elements of the OFDM system of FIG. 3 so that the same last two digits are used for the FIG. 4 elements as their correspondents in FIG. 3.

Responsive to the control signal(s) from the receiving node 203 for a declining WDM channel, the transmitting node 201 reduces the number of sub-carrier channels. That is, the number of sub-carrier channels issuing from the deserializer 432 of the transmitting module 410 is reduced. The sub-carrier channels which are not to be used are filled with zero's. As shown in FIG. 4, the unused sub-carrier channels are marked by "0" on the deserializer 432 and the corresponding missing data flows downstream are illustrated by dotted arrows and an "X." As shown in FIG. 3, the total number of possible sub-carrier channels is N. By reducing the number of sub-carrier channels to M, then the reduced data transfer rate $R_r$ is equal to (M/N)*R where R is the full data transfer rate with all N sub-carrier channels in operation. There are (N−M) unused sub-carrier channels.

For example, assuming that the alternative bandwidth lowering approach described above, the receiving node sends signals to the transmitting node that the transmitting bandwidth should be $R_r$, responsive to the BER. This implies that the reduced number of working sub-carrier channels M should be $N*(R_r\backslash R)$.

As described, the deserializer 432 is responsive to the control signals in step 214 from the remote receiving node and selects the particular sub-carrier channels which are to be used and dropped accordingly. One embodiment is to use the subcarriers ceil[i(N/M)] for i=1, 2 . . . M where ceil is the ceiling operator for the value within the brackets [ ], x. The ceiling operator maps x to the smallest integer greater than or equal to x, as is well known to those skilled in the art.

On the other end of the WDM channel 430, the receiver module 420 processes the optical signals received in the manner described previously. The serializer 462 recovers only the used sub-carrier channels, as described earlier.

Figure 5:
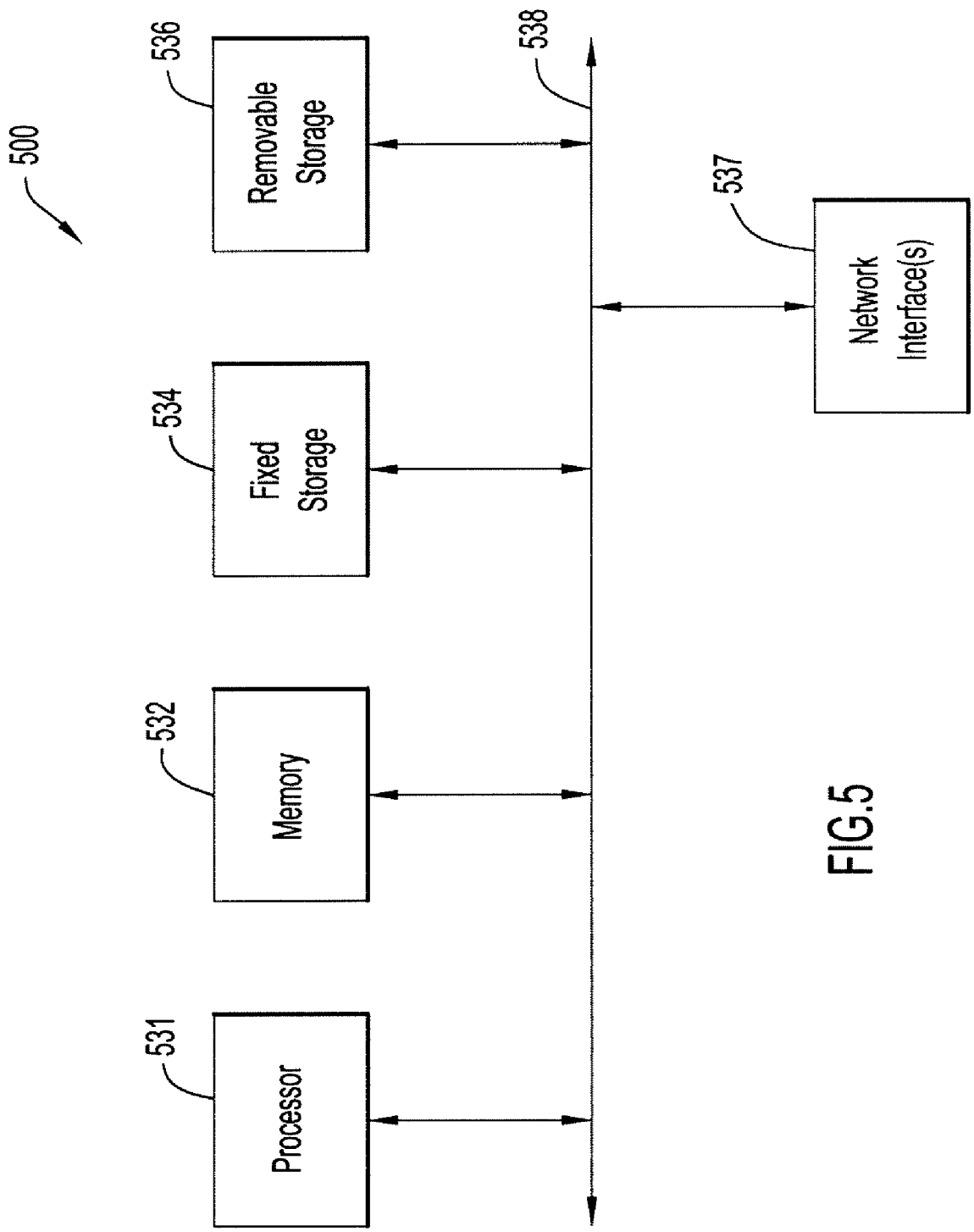
FIG. 5 illustrates the organization of a control unit in network node for adapting a communications channel to lowered optical performance.

A control unit 500 as shown in FIG. 5 can be used to control the operations of the transmitting and remote receiving nodes, such as the nodes 101 and 103 of FIG. 1. With the constituent elements described below, each control unit allows the transmitting and receiving nodes to perform their respective operations such as described in the flow chart of FIG. 2. Additionally, the control unit for the transmitting node also controls the transmitting node to select the number of sub-carrier channels and which sub-carrier channels to be used, as described above, in response to the control signals from the remote node.

The control unit 500 includes a memory subsystem 532 which can store and retrieve software programs incorporating computer code that implements aspects of the invention, data for use with the invention and the like and a central processor subsystem 531 which, among other functions, processes the instructions and data of the computer code. Example computer readable storage media for the memory 532 include semiconductor system memory preferably, CD-ROM, floppy disk, tape, flash memory, and hard drive. The control unit further includes subsystems, such as fixed storage 534 (e.g., hard drive), removable storage 36 (e.g., CD-ROM drive), and one or more network interfaces 37, all connected by a system bus 538. The network interface 537 provides a pathway for the node to communicate with the network control and management sub-system and other nodes to synchronize operations. Additional or fewer subsystems in the control block may be used. For example, the control unit may include more than one processor 531 (i.e., a multi-processor system), or a cache memory.

Hence the present invention allows the emerging OFDM technology to adapt to changing network conditions.

Even though the present invention has been described in the context of deteriorating optical fiber link conditions, it is possible to select N, the total number of sub-carrier channels for a WDM channel, to be greater than that required for the optical fiber link and to select M responsive to the changing quality of the link. M can be increased if the quality of the optical fiber link increases, say, with new, improved optical fibers, or decreases.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of transmitting signals across an optical fiber link to a remote node in an optical network, said method comprising:
    transmitting OFDM signals in a WDM channel across said optical fiber link to said remote node at a bit transfer rate;
    receiving control signals across said optical network link responsive to transmission quality of signals transmitted to said remote node; and
    adjusting a number of sub-carrier channels of said OFDM channels responsive to said received control signals to vary said bit transfer rate of said WDM channel;
    whereby optical performance of said optical fiber link is optimized.

2. The method of claim 1 wherein said sub-carrier channels adjusting step comprises reducing said number of sub-carrier channels whereby said bit transfer rate of said WDM channel is lowered.

3. The method of claim 2 wherein said sub-carrier channels reducing step comprises setting unused sub-carrier channels to zero.

4. The method of claim 3 wherein said sub-carrier channels are distributed in frequency over said WDM channel and said unused sub-carrier channels are evenly distributed in frequency over said WDM channel.

5. The method of claim 1 wherein said transmission quality of signals transmitted to said receiving node corresponds inversely to a BER of signals transmitted to said receiving node.

6. The method of claim 1 comprises a method of operating a transponder.

7. A transponder between a network node and an optical fiber link to a remote node at an opposite end of said link, said optical fiber link having a transmitting optical fiber and a receiving optical fiber, said transponder comprising:
    a network node input port receiving signals from said network node;
    a network node output port transmitting signals to said network node;
    an optical fiber link output port transmitting OFDM optical signals to said transmitting optical fiber of said optical fiber link to said remote node over a WDM channel;
    an optical fiber link input port receiving OFDM optical signals from said receiving optical fiber and passing said optical signals to said network node output port, said received signals including control signals indicative of a bit transfer rate for signals transmitted to said remote node over said WDM channel of said transmitting optical fiber; and
    a unit deserializing signals from said network node input port for a number of OFDM sub-carrier channels for said OFDM optical signals to said transmitting optical fiber, said number adjusted responsive to said received signals indicative of said bit transfer rate;
    whereby optical performance of said WDM channel is optimized.

8. The transponder of claim 7 wherein said deserializer reduces said number of OFDM sub-carrier channels to reduce said bit transfer rate for signals transmitted to said remote node over said WDM channel.

9. The transponder of claim 8 wherein said deserializer sets unused sub-carrier channels to zero to reduce said number of OFDM sub-carrier channels.

10. The transponder of claim 9 wherein said sub-carrier channels are distributed in frequency over said WDM channel and said deserializer distributes said unused sub-carrier channels evenly in frequency over said WDM channel.

11. The transponder of claim 7 wherein said signals indicative of said bit transfer rate for signals transmitted to said remote node over said WDM channel of said transmitting optical fiber comprises a BER.

12. An interface between a network node and an optical fiber link to a remote node at an opposite end of said link, said optical fiber link having a transmitting optical fiber and a receiving optical fiber, said interface comprising:
   means for receiving signals from said network node;
   means for transmitting signals to said network node;
   means for transmitting OFDM optical signals to said transmitting optical fiber of said optical fiber link to said remote node over a WDM channel;
   means for receiving OFDM optical signals from said receiving optical fiber and passing said optical signals to said network node output port, said OFDM optical signals received including signals indicative of a bit transfer rate for signals transmitted to said remote node over said WDM channel of said transmitting optical fiber; and
   a unit for deserializing signals from said network node input port for a number of OFDM sub-carrier channels, said number adjusted responsive to said received signals indicative of said bit transfer rate;
   whereby optical performance of said WDM channel is optimized.

13. The transponder of claim 12 wherein said unit reduces said number of OFDM sub-carrier channels to reduce said bit transfer rate for signals transmitted to said remote node over said WDM channel.

14. The transponder of claim 13 wherein said unit sets unused sub-carrier channels to zero to reduce said number of OFDM sub-carrier channels.

* * * * *